US005896136A

United States Patent [19]
Augustine et al.

[11] Patent Number: 5,896,136
[45] Date of Patent: Apr. 20, 1999

[54] COMPUTER GRAPHICS SYSTEM WITH IMPROVED BLENDING

[75] Inventors: Steven L. Augustine; Douglas C. Buhler, both of Fort Collins; Bryan G. Prouty, Wellington, all of Colo.

[73] Assignee: Hewlett Packard Company, Palo Alto, Calif.

[21] Appl. No.: 08/741,486

[22] Filed: Oct. 30, 1996

[51] Int. Cl.$^6$ .................................................. G06F 15/00
[52] U.S. Cl. .......................... 345/431; 345/150; 345/152; 345/155
[58] Field of Search .............................. 345/431, 150, 345/152, 155

[56] References Cited

U.S. PATENT DOCUMENTS 5,592,196  1/1997  Nakamatsu et al. ................ 345/150
5,754,185  5/1998  Hsiao et al. ........................ 345/431

*Primary Examiner*—Mark K. Zimmerman
*Assistant Examiner*—Motilewa Good-Johnson

[57] ABSTRACT

A blending system and method for blending source pixel color values with destination pixel color values in a computer graphics system according to a source alpha value includes a resolution increasing circuit that increases a number of bits in the source alpha value to produce an increased resolution source alpha value. Blending hardware implements a blending routine according to a blending equation to blend the source pixel color values with the destination pixel color values using the increased resolution source alpha value. In one embodiment, the resolution increasing circuit includes a squaring circuit that squares the source alpha value.

10 Claims, 7 Drawing Sheets

COMPUTER GRAPHICS SYSTEM WITH IMPROVED BLENDING

FIELD OF THE INVENTION

The present invention relates generally to computer graphics systems that blend color values and, more particularly, to a computer graphics system and method for increasing the resolution of the alpha blending value with minimal system resources.

BACKGROUND OF THE INVENTION

Computer graphics systems commonly are used for displaying graphical representations of objects on a two-dimensional video display screen. Current computer graphics systems provide highly detailed representations and are used in a variety of applications.

In typical computer graphics systems, an object to be represented on the display screen is broken down into graphics primitives. Primitives are basic components of a graphics display and may include points, lines, vectors and polygons, such as triangles. Typically, a hardware/software scheme is implemented to render, or draw, the graphics primitives that represent a view of one or more objects being represented on the display screen.

The primitives of the three-dimensional object to be rendered commonly are defined by a host computer in terms of primitive data. For example, when the primitive is a triangle, the host computer may define the primitive in terms of the X,Y,Z coordinates of its vertices, as well as the R, G, B color values of each vertex. Rendering hardware interpolates the primitive data to compute the display screen pixels that represent each primitive, and the R, G, B values for each pixel.

Early graphics systems failed to display images in a sufficiently realistic manner to represent or model complex three-dimensional objects. The images displayed by such systems exhibited extremely smooth surfaces absent textures, bumps, scratches, shadows and other surface details present in the object being modeled.

As a result, methods were developed to display images with improved surface detail. Texture mapping is one such method that involves mapping a source image, referred to as a texture, onto a surface of a three-dimensional object, and thereafter mapping the textured three-dimensional object to the two-dimensional graphics display screen to display the resulting image. Texture mapped surface detail attributes commonly include color, specular reflection, vector perturbation, specularity, transparency, shadows, surface irregularities and grading.

Texture mapping involves applying one or more point elements (texels) of a texture to each point element (pixel) of the displayed portion of the object to which the texture is being mapped. Texture mapping hardware is conventionally provided with information indicating the manner in which the texels in a texture map correspond to the pixels on the display screen that represent the object. Each texel in a texture map is defined by S and T coordinates which identify its location in the two-dimensional texture map. For each pixel, the corresponding texel or texels that map to it are accessed from the texture map, and incorporated into the final R, G, B values generated for the pixel to represent the textured object on the display screen.

Blending is a technique that combines the R, G, B color values of a pixel (the "source" pixel) being processed with the R, G, B color values of a corresponding pixel (the "destination" pixel), previously computed and stored for example in a buffer (such as a frame buffer). The source pixel and the destination pixel have the same x, y screen coordinates. An alpha $\alpha$ value, associated with the source pixel, controls how much of the destination pixel color values should be combined with those of the source pixel.

Without blending, the color values of the source pixel overwrite the existing color values of the destination pixel, as though the source pixel is opaque. With blending, a user, for example, may control, to a limited degree of resolution, how much of the existing destination pixel color value should be combined with that of a source pixel. Thus, blending is used to create a translucent image, one that enables a portion of a previously stored color value "show through" a source color value. Color blending lies at the heart of techniques such as transparency, digital compositing, and painting.

One way to understand blending operations is to consider the R, G, B values of a source pixel as representing its color, and the alpha $\alpha$ value as representing its transparency (or opacity). Levels of transparency range from completely transparent to somewhat transparent (translucent) to opaque. In standard computer graphics systems that employ blending, alpha $\alpha$ is a digital word of a certain number of bits that has a value between 0 and 1. If $\alpha=0$, then the pixel is transparent. If $\alpha=1$, then the pixel is opaque. If $\alpha$ has some value between 0 and 1, then the pixel is translucent.

Blending can be understood with reference to the following analogous example. If one is viewing a destination object through colored glass, then the color seen is partly the color of the glass and partly the color of the object. The percentage of one color seen versus the other, varies depending on the transmission properties of the glass. If the glass transmits 80% of the light that strikes it, for example, then the glass has a transparency of 80% (an opacity of 20%), and the color seen is a combination of 20% glass color and 80% object color. Objects also can be viewed through multiple translucent (or transparent) surfaces such as multiple pieces of glass. Similarly, computer graphics blending operations can be performed with multiple source images. During blending, color values of source pixels are combined with color values of corresponding destination pixels (on a pixel-by-pixel basis) in a two-stage process. The color values typically are combined by blending hardware in computer graphics systems. The source $R_s$ and destination $R_d$ values are combined separately from the source $G_s$ and destination $G_d$ values which are combined separately from the source $B_s$, and destination $B_d$ values. Each of the values is combined using digital arithmetic hardware according to standard blending equations that involve the color values and the source alpha $\alpha$ value. Such blending equations are standard in the industry and are listed in the OpenGL Programming Guide The Official Guide to Learning OpenGL, Release, by Neider, Davis and Woo (OpenGL Architecture Review Board), Addison-Wesley Publishing Company, Second Printing, August 1994, which reference herein is incorporated by reference in its entirety.

An example of a standard blending equation for back to front (in relation to a computer graphics view screen) blending is listed below.

$$R_d(1-\alpha_s)+R_s\alpha_s$$

wherein $R_d$=the destination R value, $R_s$=the source R value, and $\alpha_s$=the source $\alpha$ value. This equation typically is implemented by digital blending hardware separately for the R values, the G values and the B values (where G and B would be substituted separately for R in the above equation).

FIG. 1 is block diagram of a prior art blending system employed by a computer graphics system. As shown, the blending system includes a source 100 that provides the source pixel values $R_s$, $G_s$, $\alpha_s$, as well as blending hardware 102, and a buffer 104 that stores destination pixel values $R_d$, $G_d$, $B_d$. It should be appreciated that source 100 can be any component in a computer graphics system upstream of blending hardware 102 such as a texture mapping chip or the like. Similarly, buffer 104 can be any such storage device downstream of blending hardware 102 and upstream of a display screen, such as a frame buffer.

During operation, source pixel values $R_s$, $G_s$, $B_s$, $\alpha_s$, are provided by source 100 to blending hardware 102 along buses 106 and 108. Also, buffer 104 provides destination pixel color values $R_d$, $G_d$, $B_d$ along bus 110 to blending hardware 102. Blending hardware 102 then combines the source color values with the destination color values using the source alpha value $\alpha_s$, to control the level of transparency. The resulting blended pixel color values are provided by blending hardware 102 along bus 112 to buffer 104 which stores the resulting color values as the new destination pixel color values.

As noted above, blending hardware 102 typically implements a standard blending equation to separately combine the R values $R_s$ and $R_d$, the G values $G_s$, and $G_d$, and the B values $B_s$, and $B_d$, each having the same level of transparency controlled by the alpha source value $\alpha_s$. Thus, each of the source color values $R_s$, $G_s$, and $B_s$ is separately provided from source 100 to blending hardware 102 along bus 108. Similarly, each of destination pixel color values $R_d$, $G_d$, $B_d$ is separately provided by bus 104 to blending hardware 102 along bus 110.

Typically, each of the color values $\alpha$, R, G, B is an f-bit word where f is an integer. f can be 8 for example. The hardware must be capable of transferring and manipulating f-bit digital words. In the example shown in FIG. 1, each of buses 106, 108, 110 and 112 is an f-bit bus. Additionally, the digital logic employed by the blending hardware is capable of manipulating f-bit digital words. It should be appreciated that as the number of bits f in each word increases, the complexity and cost of the blending hardware and associated buses also increases.

FIG. 2 is a partial block, partial schematic diagram of a particular embodiment of a prior art blending system, wherein like reference characters are used to denote like elements in the block diagram of FIG. 1. As shown, like FIG. 1, the system includes source 100, blending hardware 102, and buffer 104 which, in this example, is a frame buffer. Blending hardware 102 includes a digital subtractor 118, digital multipliers 114 and 126, and a digital adder 130. It is assumed in this particular example that each of the pixel color values $\alpha$, R, G, B is an 8-bit word. During operation, source alpha value a, is provided from source 100 along bus 106 to subtractor 118 and along bus 116 to multiplier 114. Simultaneously, source color value $R_s$, is provided from source 100 along bus 108 to multiplier 114. It should be understood that each source color value $R_s$, $G_s$, and $B_s$ is provided separately from source 100 and each destination pixel color value $R_d$, $G_d$, $B_d$ is provided separately frame buffer 104. The example will be described only with respect to the R color values $R_s$ and $R_d$.

An 8-bit digital word representing 1 is provided along bus 120 to subtractor 118. Subtractor 118 provides the 8-bit difference $1-\alpha_s$ along 8-bit bus 122 to multiplier 126. Multiplier 114 provides the 8-bit product $R_s\alpha_s$ along bus 124 adder 130.

Simultaneously, frame buffer 104 provides destination pixel color value $R_d$ along bus 110 to multiplier 126. Multiplier 126, in turn, provides product $R_d(1-\alpha_s)$ along 8-bit bus 128 to adder 130. Adder 130 provides the 8-bit sum $R_d(1-\alpha_s)+R_s\alpha_s$ along bus 112 to frame buffer 104. The sum equation represents the new blended destination pixel color value $R_d$ which overwrites previous destination pixel color value $R_d$.

The process described above is conducted simultaneously for color values G and B (wherein G and B would be substituted for R) by similar hardware (not shown) such that new destination pixel values $R_d$, $G_d$, $B_d$ overwrite the previous destination pixel color values in frame buffer 104. This process can be repeated multiple times for multiple different source pixel color values when multiple images are to be blended.

Not shown in FIG. 2 are correction blocks that are located between subtractor 118 and multiplier 126 within bus 122, and between adder 130 and frame buffer 104 within bus 112. As will be understood by those skilled in the art, the correction blocks (not shown) provide correction factors to the digital words to correct for inaccuracies or errors caused by the digital arithmetic operations.

The resolution (the number of bits) in each of the digital words is limited by the hardware employed by the blending system. The resolution of alpha $\alpha$, controls the number of available transparency levels. Thus, the hardware is the limiting factor in the available levels of transparency.

When alpha is an 8-bit word, there are 256 available levels of transparency. This is a fairly limited number of levels of transparency for most graphics applications. If many images are to be blended together, requiring many iterations by the blending hardware with multiple different source pixels (one for each image to be blended), then the level of transparency of the resulting blended image will begin to approach opaqueness due to the blending scheme.

It is desirable in computer graphics systems that provide blending, to provide as many transparency levels as possible, which gives the user more flexibility in blending images, particularly where multiple images are to be blended. One possible solution is to increase the resolution of alpha $\alpha$ by increasing the bit-handling capacity of the blending hardware. For example, increasing alpha $\alpha$ from an 8-bit word to a 16-bit word improves the resolution tremendously but requires the employment of more complex, expensive and probably physically larger digital hardware.

It accordingly is an aim of the present invention to provide a computer graphics system having blending capabilities with increased transparency levels without significantly increasing hardware cost and complexity.

SUMMARY OF THE INVENTION

An embodiment of the invention is directed to a computer graphics system that blends source pixel color values with destination pixel color values. The system includes a source that provides the source alpha $\alpha$, and R, G, and B color values. A buffer provides the destination pixel color values including destination alpha $\alpha$ and R, G, and B. A resolution increasing circuit, coupled to the source, increases the number of bits in the source alpha value $\alpha$ to produce an increased resolution source alpha value. Blending hardware, coupled to the source, the buffer, and the resolution increasing circuit, implements a blending routine according to a blending equation to blend the source pixel color values with the destination pixel color values using the increased resolution source alpha value.

In an embodiment of the present invention, the resolution increasing circuit includes a squaring circuit that squares the source alpha value.

In one embodiment of the invention, the source alpha value is an 8-bit word and the increased resolution source alpha value is at least a 10-bit word.

Another embodiment of the present invention is directed to a method for blending source pixel color values with destination pixel color values in a computer graphics system. The method includes the steps of: receiving the source pixel color values, including source alpha α, and R, G, and B; receiving the destination pixel color values, including destination alpha α, and R, G, and B; increasing a number of bits in the source alpha value to produce an increased resolution source alpha value; implementing a blending routine according to a blending equation to blend the source pixel color values with the destination pixel color values using the increased resolution source alpha value.

In an embodiment of the invention, the step of increasing includes a step of squaring the source alpha value.

In an embodiment of the invention, the step of increasing includes a step of increasing the number of bits in the source alpha value from 8 to at least 10.

A further embodiment of the present invention is directed to a blending system employed in a computer graphics system including a source that provides source pixel color values including source alpha α, and R, G, and B values and a buffer that provides destination pixel color values including destination alpha α, and R, G, and B values. The blending system blends the source pixel color values with the destination pixel color values. The blending system includes a resolution increasing circuit, coupled to the source, that increases a number of bits in the source alpha value to produce an increased resolution source alpha value. The system also includes blending hardware, coupled to the source, the buffer and the resolution increasing circuit, that implements a blending routine according to a blending equation to blend the source pixel color values with the destination pixel color values using the increased resolution source alpha value.

BRIEF DESCRIPTION OF THE DRAWINGS

For a better understanding of the present invention, reference is made to the accompanying drawings, which arc incorporated herein by reference and in which.

DETAILED DESCRIPTION

The present invention is directed to computer graphics image blending. The method and system of the invention increases the resolution of the source alpha value α, thereby increasing the number of available transparency levels, without significantly increasing the complexity or cost of the blending of computer system hardware.

Figure 3:
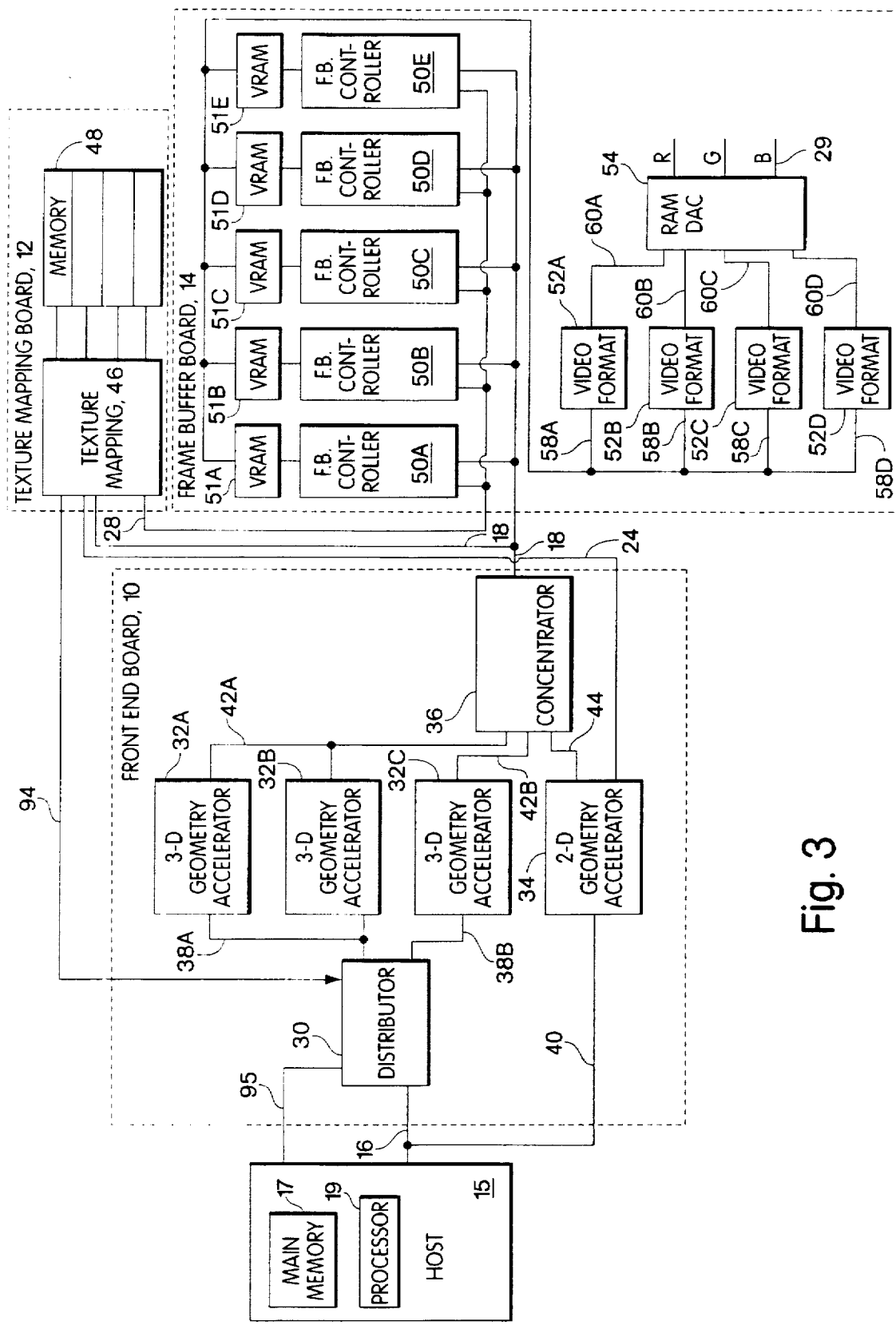
FIG. 3 is a block diagram of an exemplary computer graphics system in which the blending system of the invention may be employed.

Blending image data is a technique used in many different computer graphics applications such as volume rendering, texture mapping, animation, and scenes rendering. FIG. 3 is a block diagram of a computer graphics system that may employ the blending system and method of the present invention. It should be understood that the embodiment shown in FIG. 3 and described herein merely is exemplary with respect to the number of boards and chips, the manner in which they are partitioned, the bus widths, and the data transfer rates. Numerous other implementations are available for use with the blending system and method of the invention.

The system shown and described includes texture mapping capabilities. As shown, the system includes a front end board 10, a texture mapping board 12, and a frame buffer board 14. Front end board 10 communicates with a host computer 15 over a 52-bit bus 16. Front end board 10 receives primitives to be rendered from host computer 15 over bus 16. The primitives are specified by X, Y, Z coordinate data, R, G, B color value data, and texture S, T coordinates for portions of the primitives, such as for the vertices when the primitive is a triangle.

Figure 1:
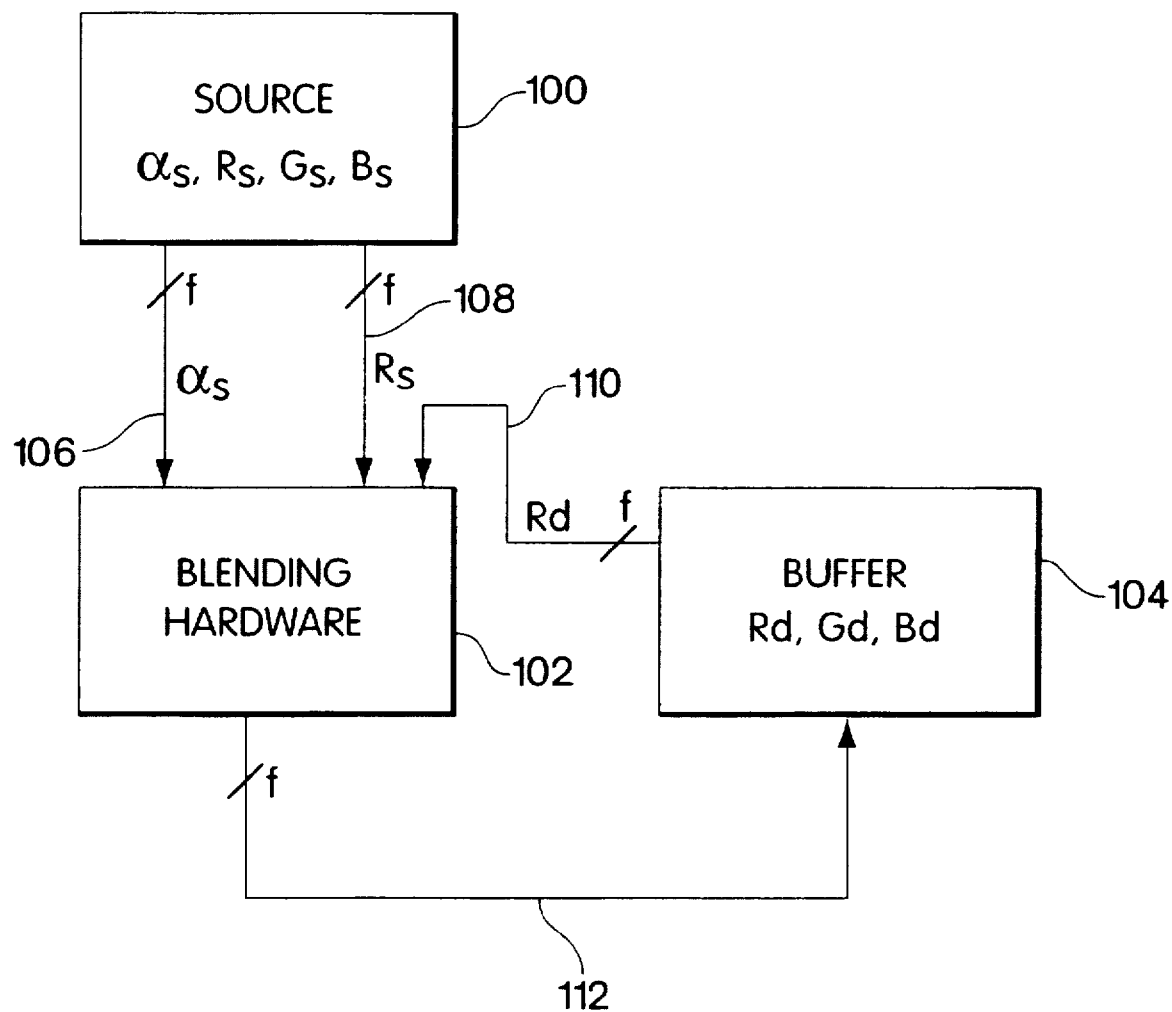
FIG. 1 is a block diagram of a prior art computer graphics blending system.

Data representing the primitives in three dimensions then is provided by the front end board 10 to the texture mapping board 12 and the frame buffer board 14 over 64-bit bus 18. The texture mapping board interpolates the primitive data received to compute the screen display pixels that will represent the primitive, and determines corresponding resultant texture data for each primitive pixel. The resultant texture data is provided to the frame buffer board over five 55-bit buses 28, which are shown in FIG. 1 as a single bus for clarity of illustration.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R, G, B values for each pixel. R, G, B color control signals for each pixel are respectively provided over R, G, B lines 29 to control the pixels of the display screen (not shown) to display a resulting image on the display screen that represents the texture mapped primitive.

The front end board 10, texture mapping board 12 and frame buffer board 14 each is preferably pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 may include a distributor chip 30, 3-dimensional (3-D) geometry accelerator chips 32A, 32B and 32C, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C. Both buses 38A and 38B transfer data at a rate of 60 MHz and provide sufficient bandwidth to support two 3-D geometry accelerator chips. 2-D primitive data is provided over a 44-bit bus 40 to the 2-D geometry accelerator chip 34 at a rate of 40 MHz.

Each 3-D geometry accelerator chip transforms the X,Y,Z coordinates that define the primitives received into corresponding screen space coordinates, determines object R, G, B values and texture S,T values for the screen space coordinates, decomposes quadrilaterals into triangles, and computes a triangle plane equation to define each triangle. Each 3-D geometry accelerator chip also performs view clipping operations to ensure an accurate screen display of the resulting image when multiple windows within the screen are displayed, or when a portion of a primitive extends beyond the view volume represented on the display screen. Relevant operations performed by each 3-D geometry accelerator chip are described in more detail below. Output data from the 3-D geometry accelerator chips 32A, 32B and 32C is provided over 44-bit buses 42A and 42B to concentrator chip 36 at a rate of 60 MHz. Two-dimensional geometry accelerator chip 34 also provides output data to concentrator chip 36 over a 46-bit bus 44 at a rate of 45 MHz. Concentrator chip 36 combines the 3-D primitive output data received from the 3-D geometry accelerator chips 32A–C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which preferably is arranged as a cache memory. In a preferred embodiment of the invention, the cache memory is formed from a plurality of SDRAM (synchronous dynamic random access memory) chips. The cache memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A–C include points, lines and triangles. The texture mapping board does not perform texture mapping of points or lines, and operates only upon triangle primitives. The data representing the triangle primitives includes the X,Y,Z object pixel coordinates for one vertex, the object color R, G, B values of the same one vertex, the coordinates in S,T of the portions of the texture map that correspond to the same one vertex, and the plane equation of the triangle. The texture mapping chip 46 ignores the object pixel z coordinate and the object color R, G, B values. The chip 46 interpolates the X,Y pixel coordinates to calculate S and T coordinates that correspond to each X,Y screen display pixel that represents the primitive. For each pixel, the texture mapping chip accesses the portion of the texture MIP map that corresponds thereto from the cache memory, and computes resultant texture data for the pixel, which may include a weighted average of multiple texels.

The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A, 50B, 50C, 50D and 50E are respectively coupled to groups of associated VRAM (video random access memory) chips 51A–E. The frame buffer board may further include four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R, G, B color values for each pixel coordinate. For those primitives (i.e., triangles) for which resultant texture data is provided from the texture mapping board, the frame buffer controller chips combine, on a pixel by pixel basis, the object color values and the resultant texture data to generate final R, G, B values for each pixel to be displayed on the display screen. The object color values and texture color values are blended in accordance with a blending scheme and by the blending system of the present invention. The object color values and texture color values are blended in accordance with a blending scheme and by the blending system of the present invention.

The resulting image video data generated by the frame buffer controller chips 50A–E, including R, G, B values for each pixel, is stored in the corresponding VRAM chips 51A–E. Each group of VRAM chips 51A–E includes eight VRAM chips, such that forty VRAM chips are located on the frame buffer board. Each of video format chips 52A–D is connected to, and receives data from, a different set of ten VRAM chips. The video data serially is shifted out of the VRAM chips and is respectively provided over 64-bit buses 58A, 58B, 58C, and 58D to the four video format chips 52A, 52B, 52C and 52D at a rate of 27 MHz. The video format chips format the video data so that it can be handled by the RAMDAC and provide the formatted data over 32-bit buses 60A, 60B, 60C and 60D to RAMDAC 54 at a rate of 33 MHz. RAMDAC 54, in turn, converts the digital color data to analog R, G, B color control signals and provides the R, G, B control signals for each pixel to a screen display (not shown) along R, G, B control lines 29.

Figure 4:
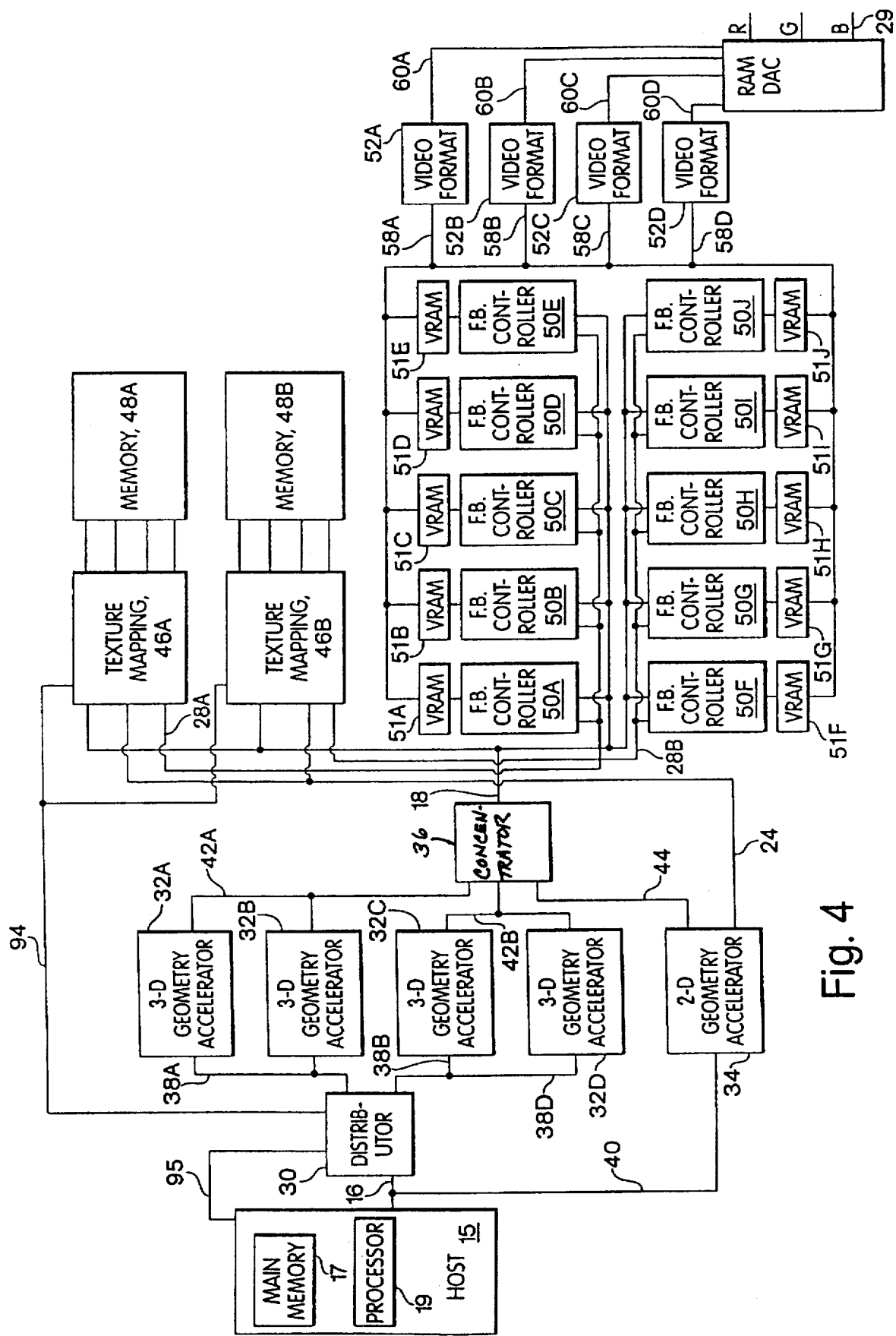
FIG. 4 is a block diagram of another exemplary computer graphics system in which the blending system of the invention may be employed.

In alternate embodiment, hardware on texture mapping board 12 and frame buffer board 14 is replicated so that certain primitive rendering tasks may be performed on multiple primitives in parallel, thereby increasing the bandwidth of the system. An example of such an alternate embodiment computer graphics system, in which the blending system of the present invention may be employed, is shown in FIG. 4. The system of FIG. 4 includes four 3-D geometry accelerator chips 32A, 32B, 32C, and 32D, to texture mapping chips 46A and 46B respectively associated with cache memories 48A and 48B, and ten frame buffer chips 50A–50J, each with an associated group of VRAM chips. Operation of the system of FIG. 4 is similar to that of FIG. 3, described above.

Replication of the hardware in the embodiment of FIG. 4 allows for increased system bandwidth because certain primitive rendering operations can be performed in parallel on multiple primitives.

Figure 5:
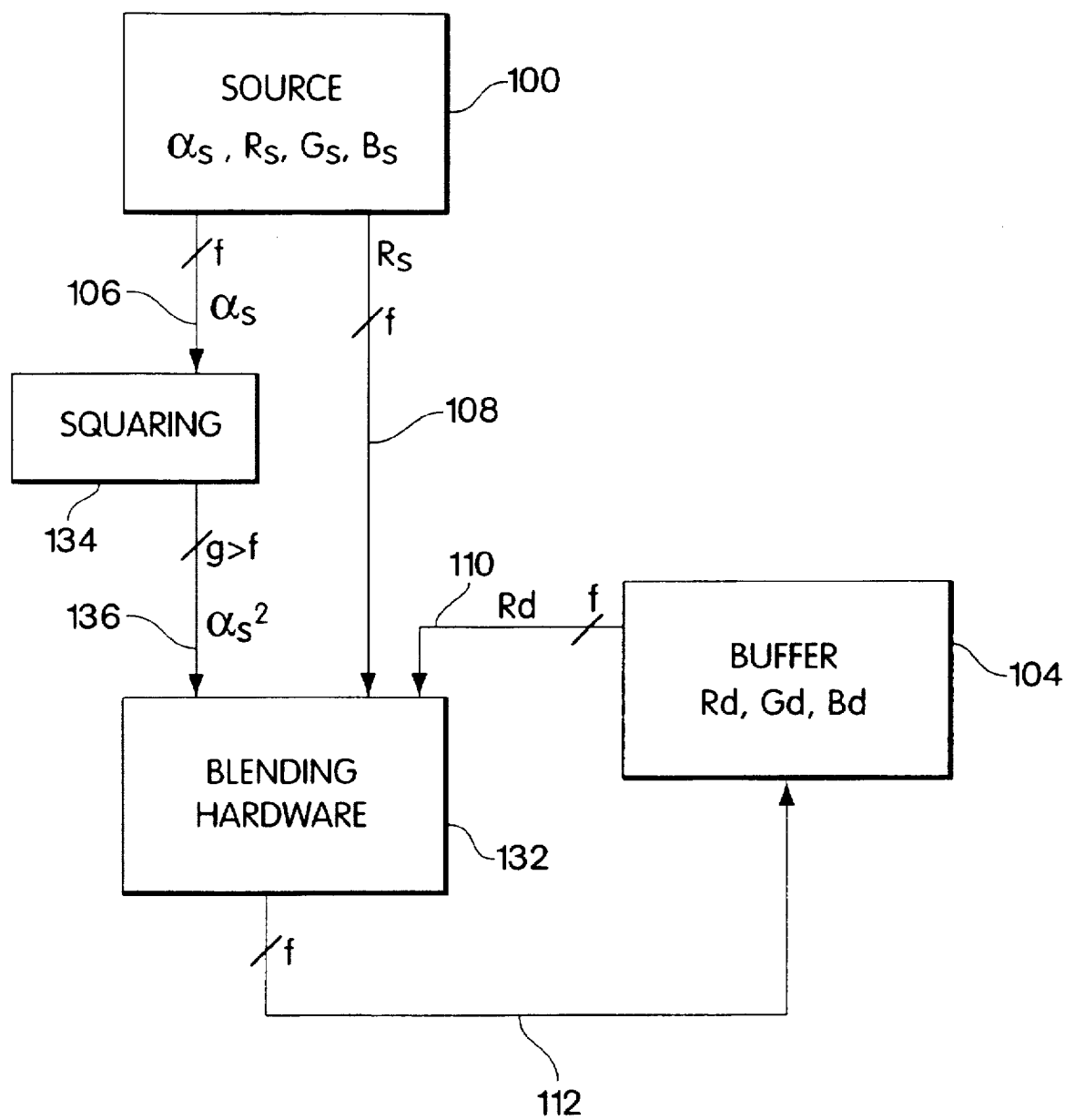
FIG. 5 is a block diagram of the computer graphics blending system of the present invention.

FIG. 5 is a block diagram of a blending system according to the present invention. Like reference characters are used to denote similar elements to those in previous figures. The system includes source 100, blending hardware 132, and buffer 104. As in the prior art embodiment, source 100 provides source pixel color values $R_s$, $G_s$, $B_s$, and $\alpha_s$. Similarly, buffer 104 provides destination pixel color values $R_d$, $G_d$, $B_d$. By contrast with prior art systems, the blending system of the invention includes a resolution increasing circuit 134 that increases the resolution of the source alpha value $\alpha_s$ for improved transparency performance without unduly increasing system hardware complexity or cost.

Operation of the system the invention will be described with reference to FIG. 5. It is assumed that each of the color values is an f-bit digital word, where f is an integer >1. During operation, source alpha value $\alpha_s$ is provided by source 100 along bus 106 to squaring circuit 134. Source color value $R_s$ is provided by source 100 along bus 108 to blending hardware 132. Destination color value $R_d$ is provided by buffer 104 along bus 110 to blending hardware 132. As noted above, blending hardware 132 blends the color values separately for R, G, and B. Operation of the blending system will be described only with respect to color values $R_s$ and $R_d$. It should be appreciated that operation is similar for the G color values and B color values.

Resolution increasing circuit 134 in this embodiment is a squaring circuit that squares source alpha value $\alpha_s$ and provides the product $\alpha_s^2$ to blending hardware 132. Assuming $\alpha_s$ is an f-bit digital word, then $\alpha_s^2$ is a g-bit digital word where g is greater than f. After the squaring is performed, the number of bits in the $\alpha_s^2$ term can be reduced by retaining only the g most significant bits. Reducing the number of bits preferably is performed by dithering but may alternatively may be performed by rounding or truncation, as should be understood by those skilled in the art.

Using the $\alpha_s^2$ term, blending hardware 132 implements a standard blending equation and truncates the result to an f-bit word by retaining the f most significant bits. The result is provided along f-bit bus 112 to buffer 104.

By squaring the $\alpha_s^2$ term, the resolution (number of bits) of $\alpha_s$ is increased without significantly increasing the complexity and cost of the blending system. The increased resolution alpha term provides an increase in the number of available transparency levels.

Figure 6:
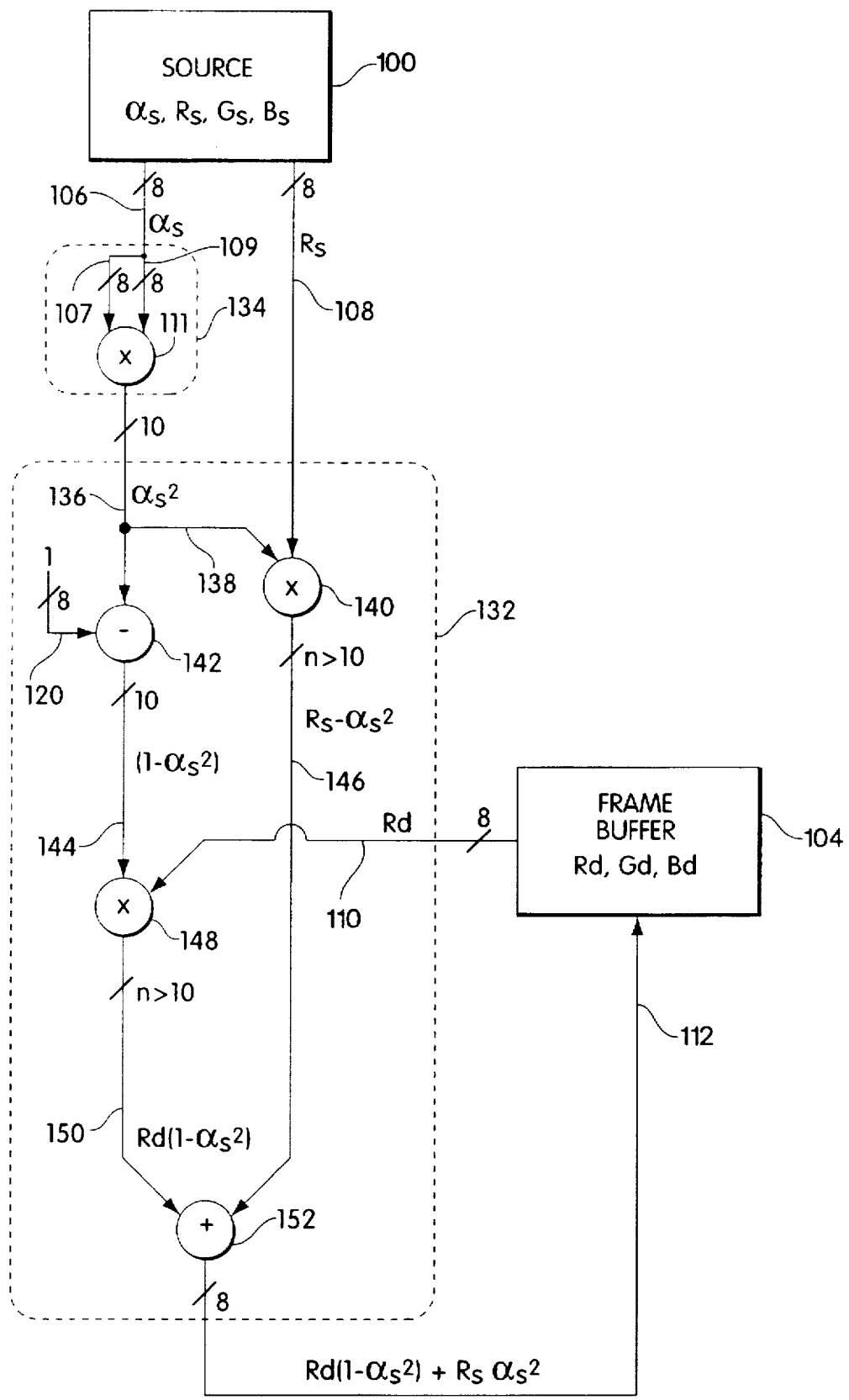
FIG. 6 is a part schematic, part block diagram of an exemplary embodiment of the computer graphics blending system of the present invention.

FIG. 6 is a part schematic, part block diagram of an exemplary embodiment of the blending system according to the present invention. As shown, the system includes source 100, squaring circuit 134, blending hardware 132, and frame buffer 104. In this example, it is assumed that each of the color values is an 8-bit word.

Squaring circuit 134 includes digital multiplier 111 and 8-bit buses 107 and 109. Blending hardware 132 includes digital subtractor 142, digital multipliers 140 and 148, and digital adder 152.

During operation, the alpha source value $\alpha_s$ is provided by source 100 along 8-bit bus 106 then along 8-bit buses 107 and 109 to multiplier 111. Multiplier 111 multiplies $\alpha_s$ by itself and provides the squared term $\alpha_s^2$ along 10-bit bus 136. In this example, after the squaring of the $\alpha$, term is performed, $\alpha_s^2$ is truncated to 10 bits by retaining the 10 most significant bits of the square term $\alpha_s^2$. It should be appreciated that any number of bits can be retained depending on the resolution desired and hardware available.

Squared alpha term $\alpha_s^2$ is provided along 10-bit bus 136 to subtractor 142 and along 10-bit bus 138 to multiplier 140. Source 100 also provides source color value $R_s$ along an 8-bit bus 108 to multiplier 140. Subtractor 142 also receives an 8-bit word having a value of 1 along 8-bit bus 120. Subtractor 142 subtracts the $\alpha_s^2$ term from the 8-bit word having a value of 1 and provides the 10-bit difference $1-\alpha_s^2$ along 10-bit bus 144 to multiplier 148.

Multiplier 140 multiplies $\alpha_s^2$ by $R_s$ and provides the n-bit product $\alpha_s^2$ along bus 146 to adder 152. In this example, n is an integer number of bits greater than 10. Multiplier 148 receives destination color value $R_d$ along 8-bit bus 110 from frame buffer 104 and multiplies $R_d$ by $1-\alpha_s^2$. The product $R_d(1-\alpha_s^2)$ is provided along n-bit bus 150 to adder 152.

Adder 152 adds $R_{s\alpha s}^2$ to $R_d(1-\alpha_s^2)$ and truncates the result to 8 bits. The result $R_d(1-\alpha_s^2)+R_s\alpha_s^2$ is an 8-bit result provided along bus 112 to frame buffer 104. The result is a blended combination of $R_d$ and $R_s$ using the squared alpha term $\alpha_s^2$. The process is repeated for each of the G and B color values. The blended term overwrites the previous destination term in frame buffer 104. In addition, the entire process can be repeated on a pixel-by-pixel basis for each of a number of pixels to be blended in an image. The increased number of transparency levels improves performance, particularly in an application when multiple pixels are to be blended.

Figure 2:
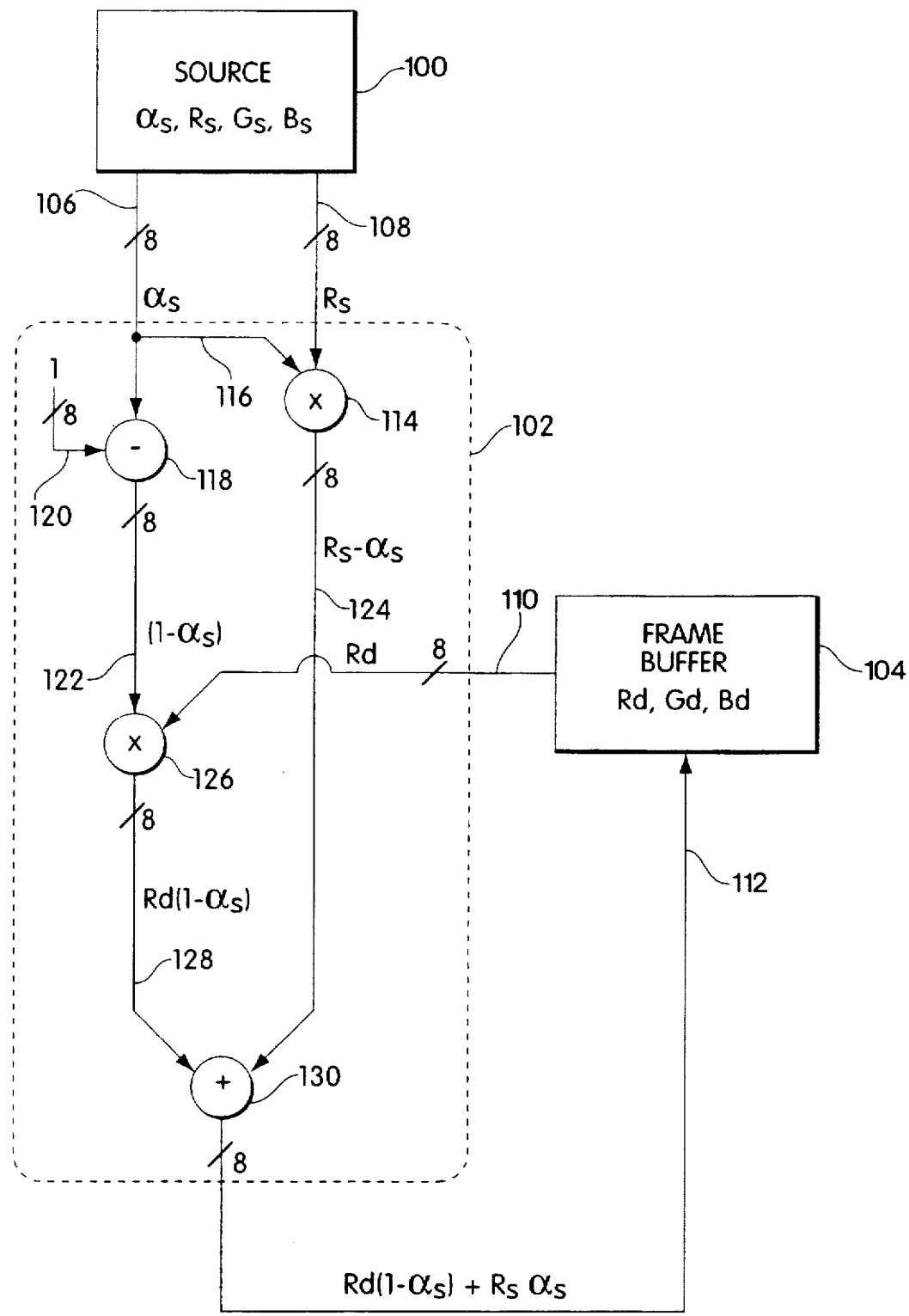
FIG. 2 is a part schematic, part block diagram of an exemplary embodiment of the prior art computer graphics blending system of FIG. 1.

Not shown are the truncation circuits for truncating the multiplication results by retaining a predetermined number of most significant bits. Such digital truncation circuits may be conventional and, therefore, should be available readily to those skilled in the art. Also not shown are the correction circuits described with reference to the prior art circuit of FIG. 2. The correction circuits also may be conventional and also, therefore, should be available readily to those skilled in the art.

While the embodiment shown and described with reference to FIG. 6 implements one of the standard blending equations $R_d(1-\alpha_s^2)+R_s\alpha_s^2$, it should be appreciated that other blending equations can be implemented and the digital hardware of blending hardware 132 would be altered to suit such other equations. It additionally should be appreciated that, while a squaring circuit 134 was shown and described for increasing the resolution of a source alpha value $\alpha_s$, other resolution increasing circuits may be employed in the method and system of the present invention.

Figure 7:
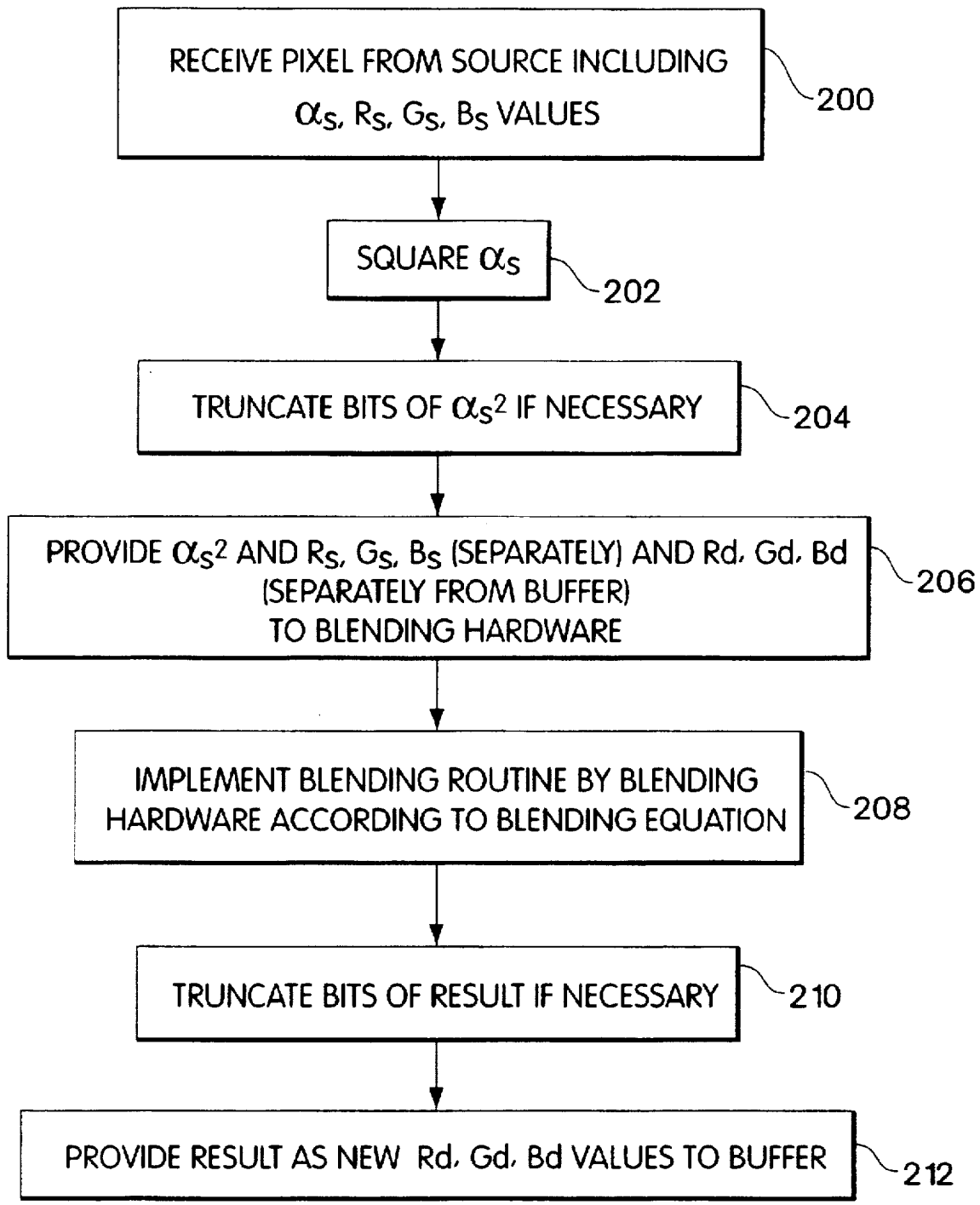
FIG. 7 is a flow diagram illustrating the steps carried out by the blending system of the present invention during a blending operation.

FIG. 7 is a flow diagram illustrating the steps carried out by the system of the present invention during a blending operation. The operation begins at step 200 where source pixel color values $R_s$, $G_s$, $B_s$, and $\alpha_s$ are received from a source. Then, at step 202, source $\alpha_s$ is squared. At step 204, if necessary, then the bits of the squared alpha term $\alpha_s^2$ are truncated to a predetermined number of bits by retaining the predetermined most significant bits of the squared term.

In step 206, squared alpha term $\alpha_s^2$, and each of the source color values $R_s$, $G_s$, and $B_s$ and each of the destination color values $R_d$, $G_d$, and $B_d$ separately are provided to the blending hardware. With reference to FIGS. 5 and 6, squared alpha term $\alpha_s^2$ term is provided by squaring circuit 134, the source color values are provided by source 100, and the destination color values are provided by frame buffer 104.

In step 208, a blending routine is implemented by the blending hardware according to a blending equation using the squared alpha term $\alpha_s^2$ separately to blend the source pixel color values $R_s$, $G_s$, $B_s$ with the destination pixel color values $R_d$, $G_d$, $B_d$, respectively. In step 210, the bits of the result of the blending equation are truncated if necessary. Then, the results are provided as new destination color values $R_d$, $G_d$, and $B_d$ to the buffer.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A computer graphics system that blends source pixel color values with destination pixel color values comprising:

a source that provides the source pixel color values including source alpha a and R, G, B color values;

a buffer that provides the destination pixel color values including destination alpha α and R, G, B color values, wherein each of the source pixel color values and destination pixel color values is an n-bit word;

a resolution increasing circuit, coupled to the source, that increases the number of bits in the source alpha value by x bits to produce an increased resolution source alpha value having n+x bits, wherein each of the n and x is a positive integer, the resolution increasing circuit including a squaring circuit that squares the source alpha value; and blending hardware, coupled to the source, the buffer and the resolution increasing circuit, that implements a blending routine according to a blending equation to blend the source pixel color values with the destination pixel color values using the increased resolution source alpha value.

2. The computer graphics system as claimed in claim 1 wherein the source alpha value is an 8-bit word.

3. The computer graphics system as claimed in claim 2 wherein the increased resolution source alpha value is at least a 10-bit word.

4. A method for blending source pixel color values with destination pixel color values in a computer graphics system comprising the steps of:

receiving the source pixel color values including source alpha α and R, G, B color values;

receiving the destination pixel color values including destination alpha α and R, G, B color values, wherein each of the source pixel color values and destination pixel color values is an n-bit word;

increasing the number of bits in the source alpha value by x bits to produce an increased resolution source alpha value having n+x bits, wherein each of n and x is a positive integer;

wherein the step of increasing includes the step of producing an increased resolution source alpha value having a value approximately equal to the square of the source alpha value;

implementing a blending routine according to a blending equation to blend the source pixel color values with the destination pixel color values using the increased resolution source alpha value.

5. The method as claimed in claim 4 wherein the step of increasing includes a step of increasing the number of bits in the source alpha value from 8 to at least 10.

6. In a computer graphics system, including a source that provides source pixel color values including source alpha α and R, G, B color values, and a buffer that provides destination pixel color values including destination alpha α and R, G, B color values, each of the source pixel color values and destination pixel color values being an n-bit word, a blending system that blends the source pixel color values with the destination pixel color values, the blending system comprising:

a resolution increasing circuit, coupled to the source, that increases the number of bits having n+x bits in the source alpha value to produce an increased resolution source alpha value having n+x bits, wherein each of n and x is a positive integer, the resolution increasing circuit including a squaring circuit for producing the increased resolution source alpha value having a value approximately equal to the square of the source alpha source; and blending hardware, coupled to the source, the buffer, and the resolution increasing circuit, that implements a blending routine according to a blending equation to blend the source pixel color values with the destination pixel color values using the increased resolution source alpha value.

7. The blending system as claimed in claim 6 where the source alpha value is an 8-bit word.

8. The blending system as claimed in claim 7 wherein the increased resolution source alpha value is at least a 10-bit word.

9. A blending system for blending a first n-bit color value with a second n-bit color value, the system comprising:

a resolution increasing circuit that receives an n-bit input alpha value and produces an n+x-bit output alpha value having a value approximately equal to the square of the input alpha value, wherein each of n and x is a positive integer; and blending hardware, coupled to the resolution increasing circuit, that receives the n+x-bit output alpha value and the first and second n-bit color values, and blends the first and second color values according to a blending equation using the output alpha value.

10. A method for blending a first n-bit color value with a second n-bit color value, comprising the steps of:

receiving the first n-bit color value;

receiving the second n-bit color value;

receiving an n-bit alpha value;

increasing the number of bits in the n-bit alpha value by x to produce an n+x-bit alpha value by squaring the n-bit alpha value, wherein each of n and x is a positive integer; and blending the first n-bit color value with the second n-bit color value using the n+x-bit alpha value.

* * * * *

UNITED STATES PATENT AND TRADEMARK OFFICE
CERTIFICATE OF CORRECTION

PATENT NO. : 5,896,136
DATED : April 20, 1999
INVENTOR(S) : Steven L. Augustine et al.

It is certified that error appears in the above-identified patent and that said Letters Patent is hereby corrected as shown below:

Column 3,
Line 4, delete "$R_s$, $G_s$, $\alpha_s$" and insert therefor -- $R_s$, $G_s$, $B_s$, $\alpha_s$ --
Line 52, delete " $\alpha$." and insert therefor -- $\alpha_s$ --

Column 9,
Line 55, delete "a. term" and insert therefor -- $\alpha_s$ term --

Column 10,
Line 2, delete "$\alpha_s^2$" and insert therefor -- $R_s\alpha_s^2$ --
Line 7, delete "$R_{sas}^2$" and insert therefor -- $R_s\alpha_s^2$ --
Line 42, "$\alpha_s$" and insert therefor -- alpha $\alpha_s$ --

Column 11,
Line 5, delete " alpha a" and insert therefor -- alpha $\alpha$ --

Signed and Sealed this

Eleventh Day of June, 2002

Attest:

Attesting Officer

JAMES E. ROGAN
Director of the United States Patent and Trademark Office